(12) United States Patent
Ernest et al.

(10) Patent No.: US 7,865,380 B2
(45) Date of Patent: Jan. 4, 2011

(54) AUTOMATED INFORMATION TECHNOLOGY MANAGEMENT SYSTEM

(75) Inventors: L. Mark Ernest, Knoxville, MD (US); Christopher Finden-Browne, Woking (GB); James R. Moore, Carnation, WA (US)

(73) Assignee: International Business Machines Corporation, Armonk, NY (US)

( * ) Notice: Subject to any disclaimer, the term of this patent is extended or adjusted under 35 U.S.C. 154(b) by 1247 days.

(21) Appl. No.: 10/005,862

(22) Filed: Nov. 8, 2001

(65) Prior Publication Data

US 2003/0088456 A1    May 8, 2003

(51) Int. Cl.
*G06F 9/44* (2006.01)
(52) U.S. Cl. .......................................................... 705/7
(58) Field of Classification Search ................ 705/7, 705/10, 1, 51, 52, 56, 63; 709/223–226
See application file for complete search history.

(56) References Cited

U.S. PATENT DOCUMENTS

| | | | |
|---|---|---|---|
| 5,249,300 | A | 9/1993 | Bachman et al. |
| 5,630,069 | A * | 5/1997 | Flores et al. ................... 705/7 |
| 5,826,239 | A * | 10/1998 | Du et al. ........................ 705/8 |
| 5,893,083 | A | 4/1999 | Eshghi et al. |
| 5,966,694 | A * | 10/1999 | Rothschild et al. ............. 705/7 |
| 6,028,997 | A | 2/2000 | Leymann et al. |
| 6,038,538 | A * | 3/2000 | Agrawal et al. ................ 705/7 |
| 6,065,009 | A | 5/2000 | Leymann et al. |
| 6,249,769 | B1 | 6/2001 | Ruffin et al. |
| 6,311,175 | B1 * | 10/2001 | Adriaans et al. .............. 706/25 |
| 6,341,279 | B1 * | 1/2002 | Nye ............................... 707/3 |
| 6,363,353 | B1 * | 3/2002 | Chen ............................ 705/10 |
| 6,393,387 | B1 * | 5/2002 | Adriaans et al. .............. 703/27 |
| 2002/0049608 | A1 * | 4/2002 | Hartsell et al. ................ 705/1 |

(Continued)

FOREIGN PATENT DOCUMENTS

EP    0 831 406 A2 *    7/1997

(Continued)

OTHER PUBLICATIONS

Moore et al., "Standardizing Reuse", Communications of the ACM, Mar. 1997 [retrieved on Feb. 6, 2003], vol. 40, No. 3, 6 pages, retrieved from: Dialog, file 15.*

(Continued)

*Primary Examiner*—Beth V Boswell
(74) *Attorney, Agent, or Firm*—Connolly Bove Lodge & Hutz LLP; Joseph P. Abate, Esq.

(57) ABSTRACT

System and process for managing an IT infrastructure which collects transaction information on a component basis. The transaction data is used to evaluate the contribution of each component of the system as well as the business value of the service, and for the infrastructure as a whole. The usage data is prepared as reports and used in an IT management workflow model to make decisions about such things as the timing of system upgrades, strategic architectural decisions, timing of sunsetting of service components, both hardware and software, and the return-on-investment (ROI) valuation of IT investments. Component values may be assessed on either a volume (number of transactions) basis, or on the discrete dollar value of the transactions supported by the component.

11 Claims, 5 Drawing Sheets

U.S. PATENT DOCUMENTS

2002/0069102 A1* 6/2002 Vellante et al. ............... 705/10
2002/0178095 A1* 11/2002 Vellante et al. ............... 705/30
2003/0171945 A1* 9/2003 Kuiper ......................... 705/1

FOREIGN PATENT DOCUMENTS

| EP | 0 854 431 A2 * | 7/1998 |
| EP | 0895169 A2 | 2/1999 |
| EP | 0 895 169 A2 * | 3/1999 |
| EP | 1 143 361 A1 * | 10/2001 |
| WO | WO-00/45266 | 8/2000 |

OTHER PUBLICATIONS

Supplementary European Search Report under 153(7) EPC dated Mar. 2, 2009.

Shuhua Liu: "Business environment scanner for senior managers: towards active executive support with intelligent agents" System Sciences, 1998., Proceedings of the Thirty-First Hawaii International Conference on Kohala Coast, HI, USA, Jan. 6-9, 1998, Los Alamitos, CA, USA, IEEE Comput. Soc., US, vol. 5, Jan. 6, 1998, pp. 18-27.

"Predicting the Future Processing of Business Processes," No. 42475, Research Disclosure vol. 424, p. 1113, Aug. 1999.

"Deriving Process Models from Method Traces," No. 428104, Research Disclosure vol. 428, p. 1668, Dec. 1999.

* cited by examiner

FIGURE 2

|  | e-Mail | ATM | Wire Transfer | Billing | Catalog | Billing | Component Value (sum of x's) |
|---|---|---|---|---|---|---|---|
| Mainframe | X | x |  | x | x | x | $ |
| Server 1 | X |  |  |  |  |  | $ |
| Server 2 |  | X | X |  |  | X | $ |
| Router 123 |  | X | X |  |  |  | $ |
| Router 456 | X |  |  | X |  |  | $ |
| PC 12345 | X |  | X |  | X |  | $ |
| ATM 1 |  | X |  |  |  |  | $ |
| DASD 123 | X |  |  |  |  |  | $ |
| T1 432 |  |  | X | X |  |  | $ |
| Printer15 |  |  |  | X |  | X | $ |
| Service Value | $.15 each | $1.50 each | 1% of total transfer | $.20 each | Total Revenue | $1.50 |  |

FIGURE 4

| Transaction Type | Value per transaction | Number of Transactions | Total Value |
|---|---|---|---|
| ATM | $1.50 | 5,000 | $7,500.00 |
| e-mail | $0.15 | 40,000 | $6,000.00 |
| Wire Transfer #1 | $20,000.00 | 1 | $200.00 |
| Wire Transfer #2 | $1,500,000.00 | 1 | $1,500.00 |
| Catalog Order | $372.86 | 1 | $372.86 |
| On-time billing | $1.50 | 7,000 | $10,500.00 |
| Total Infrastructure | | | $26,072.86 |

AUTOMATED INFORMATION TECHNOLOGY MANAGEMENT SYSTEM

FIELD OF THE INVENTION

The present invention relates to a process and system which is used to manage information technology hardware and software. Specifically, the system permits real-time monitoring of operational level value generating factors within the IT system which are then used to make automated tactical and strategic decisions based on previously established value criteria.

BACKGROUND OF THE INVENTION

Information technology (IT) systems provide businesses with automated processes for executing business transactions, including order entry and fulfillment, funds transfer, production control, and various other financial transactions. IT is often regarded as a strategic asset of the business, as critical to its success as any assembly line technology within a manufacturing environment. Depending on the type of industry, an enterprise can invest from 2-10% of its gross revenues to install and maintain its IT infrastructure. Increasingly, the competitive position of an enterprise depends on how effectively this investment is managed operationally, tactically, and strategically.

The IT infrastructures used by businesses are becoming increasingly complex. Made up of literally thousands of individual hardware and software components, such infrastructures include mainframe computers, servers, printers, workstations, various wide and local area networks, operating systems, middleware, applications, and databases. This technology is becoming increasingly embedded within the business processes. Indeed, with the advent of e-business, in some instances the technology itself is the business.

Traditionally, this technology has been managed by distinct operational, tactical, and strategic IT management processes. Technology is now available to automatically react to operational events within this infrastructure to adjust performance and correct some errors. The infrastructure is monitored for a set of operational events or errors, which, when detected, trigger the performance of predetermined actions. The set of monitored events has grown over time to the point where nearly fully automated operation is now possible.

An important limitation of current automated systems is that they deal exclusively with operational events, and that they are based on a set of technical criteria. Some business factors (such as time of day, day of week, or day of year when a transaction occurs) are entirely technical and thus lend themselves to monitoring. In general, operational data relating to the physical performance of the system (such as system uptime, response time and the like) may easily be collected and used to manage the system. However, a wide variety of business factors are not as easily expressed in terms of operational data. For example, a bank having several ATM machines at different locations may easily collect data regarding the number of transactions at each location. This data, however, does not distinguish the relative importance of the customers visiting a given location; accordingly, the bank does not have a clear indication of the strategic business value of ATM operations at that location.

There is a need for an improved automated IT management system in which the business value of various IT operations may be determined, in order to maximize the strategic value of the IT infrastructure.

SUMMARY OF THE INVENTION

The present invention addresses the above-described need by accumulating not only technical data relating to the performance of the various components involved in the IT infrastructure, but also their business condition and contribution. This combined business and technical condition of each component is then fed into a predefined set of IT management system processes, or workflows, which act not only at an operational level, but at tactical and strategic levels as well. As in the case of the operational level criteria which trigger corrective action, this combined technical and business perspective can trigger automated actions at these tactical and strategic levels, maximizing the overall value derived from investment in the technology.

A system and set of processes for managing IT infrastructure is provided by the invention. At the lowest level, each discrete component which makes up the IT infrastructure (both hardware and software) includes a software agent. This agent is responsible for monitoring not only the technical condition of the component, but also for accumulating the number and type of business transactions that component handles. All such transactions are identified and captured. As the component is utilized as part of a business transaction, the transaction type and discrete value are noted. In accordance with the system and process of the invention, the transaction data which is identified by the agents of the various components is reported to a central collection location. The raw data received from the collection locations permits a determination of the business value generated by each component. These individual value contributions can be combined to obtain a composite view of similar components, subsections of the infrastructure, or the total IT infrastructure.

When delivering business services from this infrastructure, a need exists for the management of the individual hardware and software components on a real time basis. By incorporating an intelligent agent into each component required to deliver the business services, data from each of the components can, in accordance with the invention, be linked back to the original business case developed for the service, permitting various investment type analysis to be made.

This business view of the infrastructure is then fed into the workflows of a predefined management system, in the same manner that technical data is fed into the automated operations processes. By extending the reach and range of business data down to an individual IT component, tactical decisions can be made, such as reallocation of resources and optimal times for replacement or for upgrades of components. This knowledge can be applied to other business processes such as procurement. Based on the business value generated, much more accurate determinations of return on investment can be made, knowledge which can potentially be applied to vendor negotiations.

The value of individual components can also be accumulated for various technical architectures, which can be used to influence strategic decisions. Investments can be directed to those architectures which generate the maximum return on investment based on the total business value generated, rather than based primarily on technical factors as is typically done.

BRIEF DESCRIPTION OF THE DRAWINGS

FIG. 2 illustrates the valuation of the components of the system on a per service basis, in accordance with the present invention;

FIG. 4 shows an accumulation of data from various intelligent agents used in the IT system components.

DETAILED DESCRIPTION OF A PREFERRED EMBODIMENT

Figure 1:
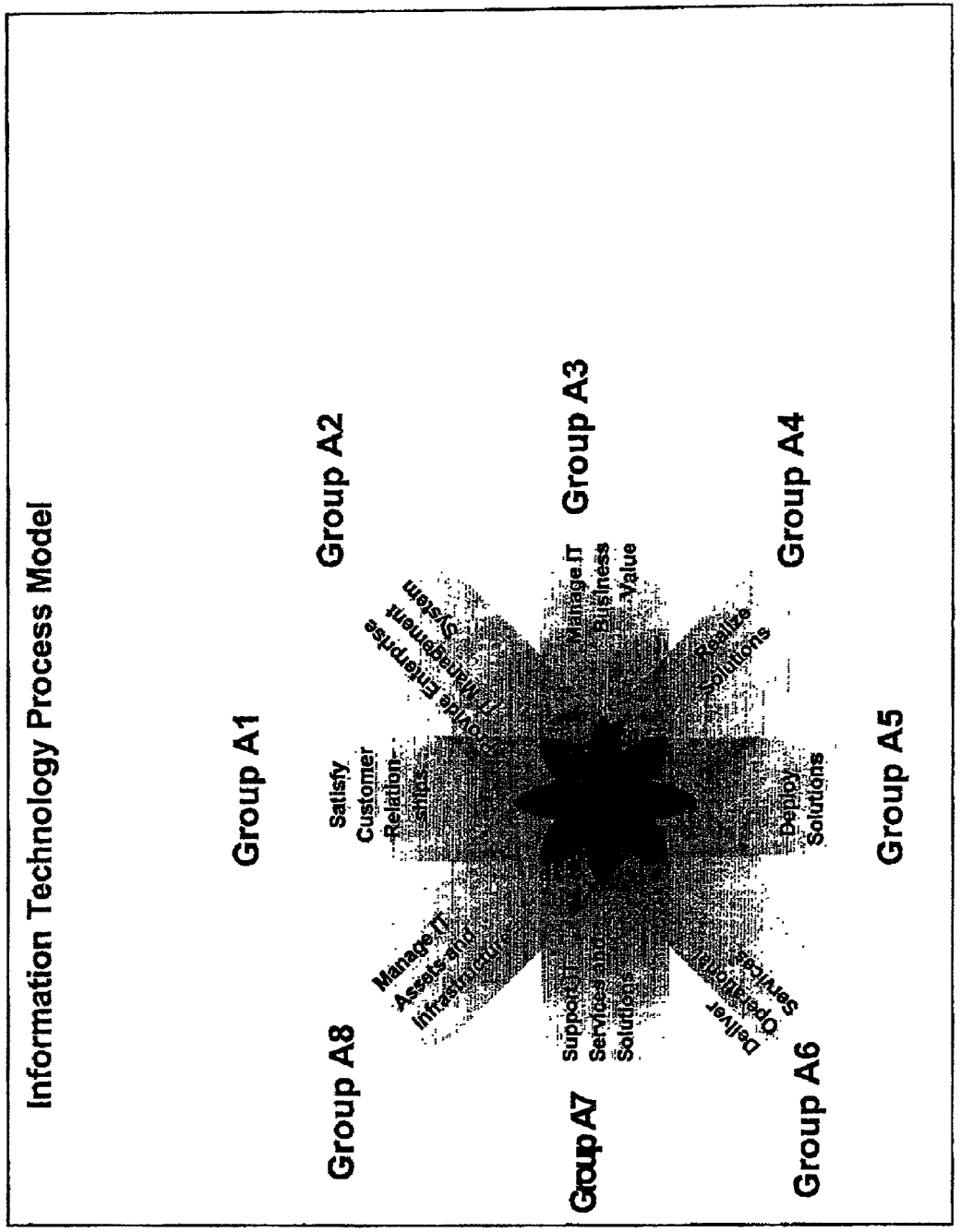
FIG. 1 illustrates an information technology process model using information derived from the present invention.

FIG. 1 illustrates an information technology process model. The process model for an IT system defines a set of eight different groups of processes; each of these is decomposed into more detailed processes, containing numerous processes which are integrated by object flows to define an integrated management model. The illustrated model defines the information flows used in the practice of the preferred embodiment of the present invention.

Process Group A1—Satisfy Customer Relationships

The purpose of the Satisfy Customer Relationships process group is to manage and optimize the communications and interaction between the customers of IT and the providers of IT. This process group establishes a mutually beneficial relationship between the customers and providers of IT, recognizing that without customers IT by itself has no intrinsic value. The processes in this group included:

A11 Understand Customer Requirements
A12 Market IT Offerings
A13 Administer Service Levels
A14 Provide IT Operational Support to Customers
A15 Manage Customer Satisfaction The Satisfy Customer Relationships process group A1 includes processes for understanding and documenting customers' needs, in addition to supporting and satisfying customers' requirements. In general, customers' needs are expressed by customers in business terms, not in information technology terms. This process group translates those needs into IT requirements, which in turn influence the information technology solutions. It should be noted that the process "Understanding Customer Requirements" is not merely performed once at the beginning of the interaction with the customer, but rather is an iterative process that may recur several times as the provider of IT better understands a given customer requirement and works toward refining a solution to meet that requirement.

This process group also addresses negotiating and managing service commitments, marketing IT opportunities to customers, providing operational support, and monitoring and managing customer satisfaction.

Process Group A2—Provide Enterprise Information Technology Management System

The purpose of this process group is to plan and create a system for managing information technology in an enterprise. The roles and responsibilities for the enterprise-wide management of IT are defined, along with the management principles and primary success indicators. Furthermore, this process group translates the plans and goals of the enterprise into IT terms so that the IT entity will be aligned with the overall objectives of the enterprise.

The processes in this group include:

A21 Establish IT Management System Framework
A22 Plan IT Management System
A23 Evaluate IT Management System This process group also establishes the guiding principles for the management of information technology and considers several variables, including financial objectives, in the formation of those guiding principles. These guiding principles may focus on such factors as (i) management style (e.g. "all teams will be self-managed"); and (ii) responsibilities (e.g. "business units will be responsible for the management of information technology where reasonable and cost effective", "all processes will have a single owner who has a defined set of responsibilities").

Process Group A3—Manage IT Value

The purpose of the Manage IT Value process group is to ensure that the enterprise receives a return on the investment it has made in information technology. The value returned to the enterprise must be identified and realized, and communicated back to the enterprise as a whole.

The processes in this group include:

A31 Establish IT Value
A32 Conduct Research
A33 Develop IT Strategy
A34 Justify Offerings & Infrastructure Portfolio
A35 Define IT Architecture
A36 Develop/Track IT Plan This process group develops the Information Technology Plan, establishes and promotes the value of information technology to the business, and focuses on the alignment of information technology with the business. The processes involved may address enterprise-wide information technology, the planning of information technology within a particular business unit, or the planning of information technology within a central location. This process group is dependent on understanding customer needs and translating them into an information plan that will meet the needs of the business.

This process group addresses the development of an IT strategy so that information technology is proactively involved in the development of the enterprise's overall business plan and is aligned with the enterprise's business objectives. In particular, the information technology plan is developed in accordance with customer requirements, offerings portfolio, architecture, resources (financial, staffing, capacity, etc.), standards and policies.

Process Group A4—Realize Solutions

The Realize Solutions process group creates solutions that will satisfy the requirements of the customers of IT. This includes both the development of new solutions and the enhancement or maintenance of existing solutions. The processes in this group include:

A41 Understand Solution Requirements
A42 Design Solutions
A43 Construct and Integrate Solutions
A44 Test Solutions
A45 Gain Customer Acceptance and Certification Components of a solution may be newly developed or purchased, and are then integrated. This process group includes engineering and manufacturing of information technology products and services and includes the making or buying of solutions, systems, integration, and furthermore includes extensions to (and maintenance of) existing solutions. The basic unit of work is assumed to be a project; projects may vary widely in size and duration. The Realize Solutions processes act together in a project driven context to create systems solutions for specific sets of customer requirements.

The Realize Solutions process group addresses a broad range of systems integration activities, including the integration of hardware components, software and network components, applications development, and other modifications to the computing infrastructure. This process group accommodates all levels of the solution's configuration (e.g. individual parts, sub-assemblies, distributed components, etc.) and component types (e.g. hardware, software, printed documentation, skills, architectures and designs, etc.).

Process Group A5—Deploy Solutions

This process group introduces changes into the IT environment in such a way as to minimize disruption to that environment. The tasks associated with the Deploy Solutions process group address all aspects of change activity, including assignments, scheduling, approval, distribution, synchronization, installation, monitoring, and activation. While change activity can be initiated from any other process, the Realize Solutions process group defines the content of the change to be deployed. The Deploy Solutions process group includes all tasks associated with incorporating that change content into the IT operational services. Furthermore, the Deploy Solutions process group provides a conceptual framework to which deployment of changes across all business units should conform. The processes in this group include:

A51 Define Change Management Practices
    A52 Plan Change Deployment
    A53 Administer Changes
    A54 Implement Solutions Process Group A6—Deliver Operational Services The Deliver Operational Services process group delivers agreed-upon services to the customer of information technology, in such a way as to produce a high degree of customer satisfaction. The processes in this group include:

A61 Enable Service Delivery Requirements
    A62 Match Resources to Commitments
    A63 Perform Services
    A64 Sustain Service Delivery Capability This process group accepts customer input, acts on that input, and produces a result. The generic element of work is a work item, which for example may be a single transaction, a request for access to a specific piece of software in a LAN environment, or a multi-hour batch job in a mainframe environment. All required resources to execute the work item are identified and allocated, and the work item is integrated with others. If the work item is a multi-phase work item, an analysis of next steps is undertaken. If the work item is complete, then resources are released and made available for the next potential work item. Any services produced are validated prior to delivery to the customer.

This process group also includes the housekeeping and maintenance of resources; for example, storage media maintenance as well as the replenishment of consumable resources such as diskettes, printer cartridges and ribbons, and paper stock. This process group also includes rudimentary diagnoses of service problems.

An important data element in this process group is the Service Delivery Plan, which guides all activities within the process. The plan includes the scheduling of available resources for specific service requests as well as the master schedule which defines the operating times of all services.

Process Group A7—Support IT Services and Solutions

The Support Information Technology Service and Solutions process group provides support functions for the operational environment from which IT services and solutions are delivered. This process group thus ensures availability and performance according to customer needs. This process group is responsible for: (i) availability of operational capacity whenever it is needed; (ii) meeting recovery objectives; (iii) resolution of problems; and (iv) accuracy of operational data with regard to configuration, problems, performance, etc. The processes in the group include:

A71 Maintain Configuration Information
    A72 Manage Availability
    A73 Manage Facilities Supporting IT
    A74 Manage Backup and Recovery
    A75 Manage IT Continuity
    A76 Manage Performance and Capacity
    A77 Manage Problems Process Group A8—Manage IT Assets and Infrastructure The Manage Information Technology Assets and Infrastructure process group manages many of the non-technology-oriented resources (such as people, finances, contracts, etc.) that support IT service delivery. The processes in this group help build and manage the necessary infrastructure for controlling IT's assets (such as hardware, software, and people). These processes are a necessary part of any enterprise management system and include personnel management, financial and administrative management, asset management, and skills management. The processes in this group include:

A81 Manage IT Finance
    A82 Procure Services and Components
    A83 Price Offerings & Administer Customer Contracts
    A84 Manage IT Inventory and Assets
    A85 Manage IT Security
    A86 Manage Human Resources
    A87 Manage Skills Portfolio The above-described management model is used to identify, define, construct, and deliver services from an IT infrastructure. The processes of the model may comprise a computer program being executed by a computer of the IT infrastructure. The IT infrastructure is comprised of a set of discrete components, composed of varying combinations of hardware, software, and middleware. These components are interconnected based on an IT architecture, which is developed using process A35 in Process Group A3, Define IT architecture Process A35.

When delivering business services from this infrastructure, a need exists for the management of the individual hardware and software components on a real time basis. By incorporating an intelligent agent into each component required to deliver the business services, data from each of the components can, in accordance with the invention, be linked back to the original business case developed for the service defined by the model permitting various investment type analyses to be made.

Figure 3:
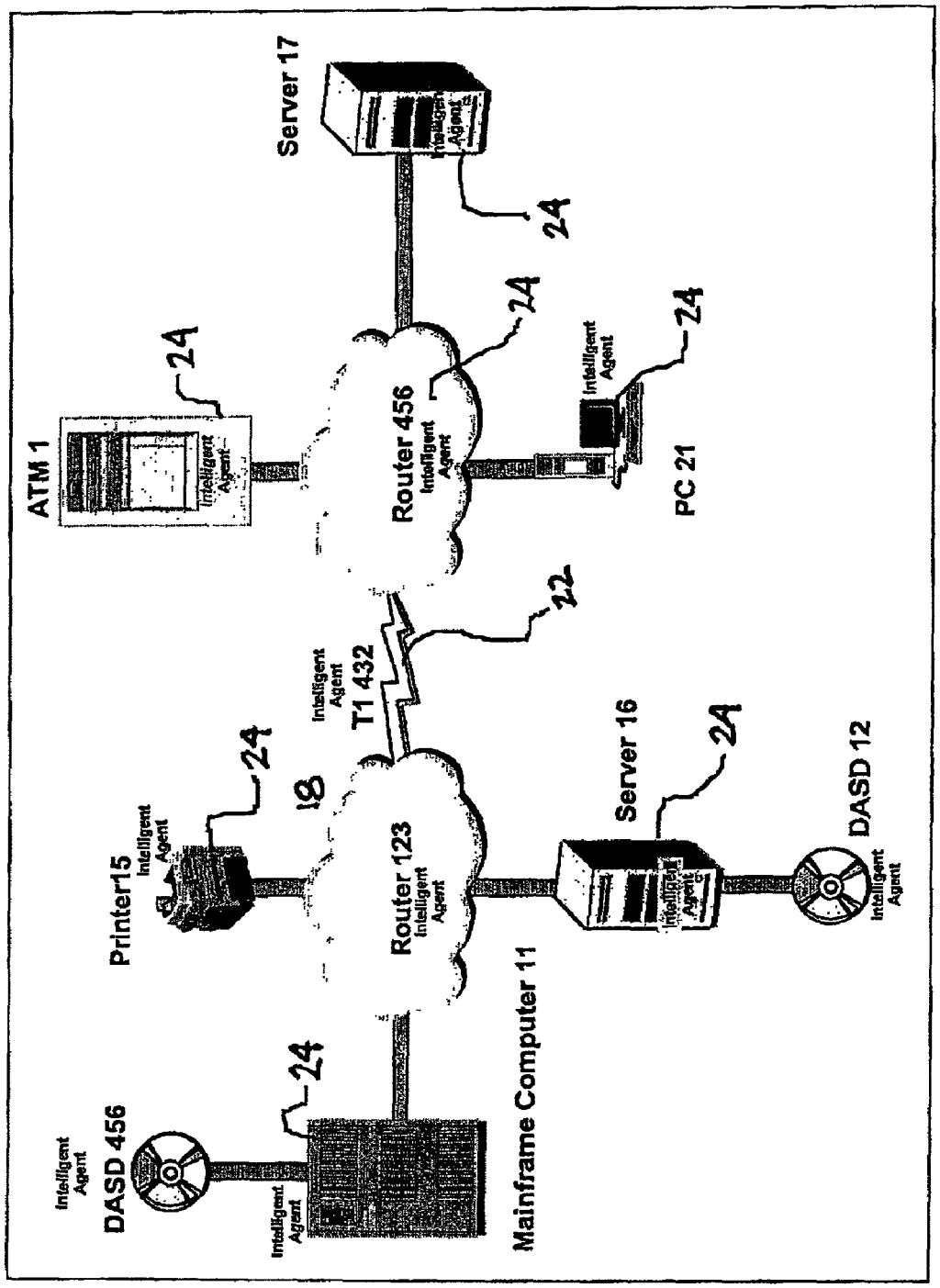
FIG. 3 illustrates an IF system which employs agents for each component for obtaining transaction data.

FIG. 2 illustrates along the y axis the various types of components which may be included in an IT infrastructure, such as shown in FIG. 3, and the types of services which depend on those components are shown along the x axis. The IT system includes a mainframe computer 11. The mainframe computer 11 is interconnected with DASD 12, printer 15, servers 16-17, routers 18-19, data terminals 21 and data transfer device 22. It will be appreciated that this arrangement of components merely illustrates a possible IT system on which the invention may advantageously be practiced. In accordance with the invention, each of the components in the IT system includes an intelligent agent 24 which runs on a dedicated processor associated with that component. The agent identifies each transaction of each service in which the respective component participates. In accordance with the invention, the business value of each service is allocated to the component for each business function requesting the service to be provided. The value shown in FIG. 2 is based on the revenue and cost associated with the service. The business value may be determined precisely, based on the monetary value of each transaction (retail sale within a transaction or total dollar value of electronic funds transfer, for example), or it could be generalized based on transaction types (approximated value for a class of e-mail, or on-time billing).

These business values are used to construct a table similar to that represented in FIG. 2. The X-axis of this table contains a list of the services performed by the IT infrastructure. The Y-axis of this table contains a list of all components contained within the infrastructure. A required component for performing a given service is indicated by an "X" in the appropriate cell in the table. For example, an "X" in the cell at the intersection of "server" and "e-mail" indicates that a server is required for delivering e-mail service, and furthermore indicates a requirement that an intelligent agent for that component collect data with respect to that service. The agent for each component is enabled to identify an occurrence of each transaction type for which it may involved during the delivery of the service.

As shown in FIG. 2, the various components of the IT infrastructure each have a value shown in the last column which is a composite value based on their use in delivering the various services. For example, the component value of the data transfer device may be viewed as the sum of the e-mail, ATM and wirenet service values. Similarly, the various services each have a value (which may be determined using a process such as the Manage IT Business Value process 3 shown schematically in FIG. 1). The total business value is thus the sum of the service values, or alternatively the sum of the component values.

The agents report data identifying each transaction in which a related component or software of the system participated. The data is reported over the network of the IT infrastructure to a computer which defines the model. The data of FIG. 4 identifies an IT infrastructure with a total value of $26,072.86. The valuations are based on the type of transaction, wherein some transactions have a low value/transaction, while others such as wire transfers have a very high valuation base on a total revenue valuation. The information shown in FIG. 4 may than be used by the system evaluators to plan on system upgrades which can be justified with such data. Services returning a high valuation can then be expanded or upgraded with additional components.

Figure 5:
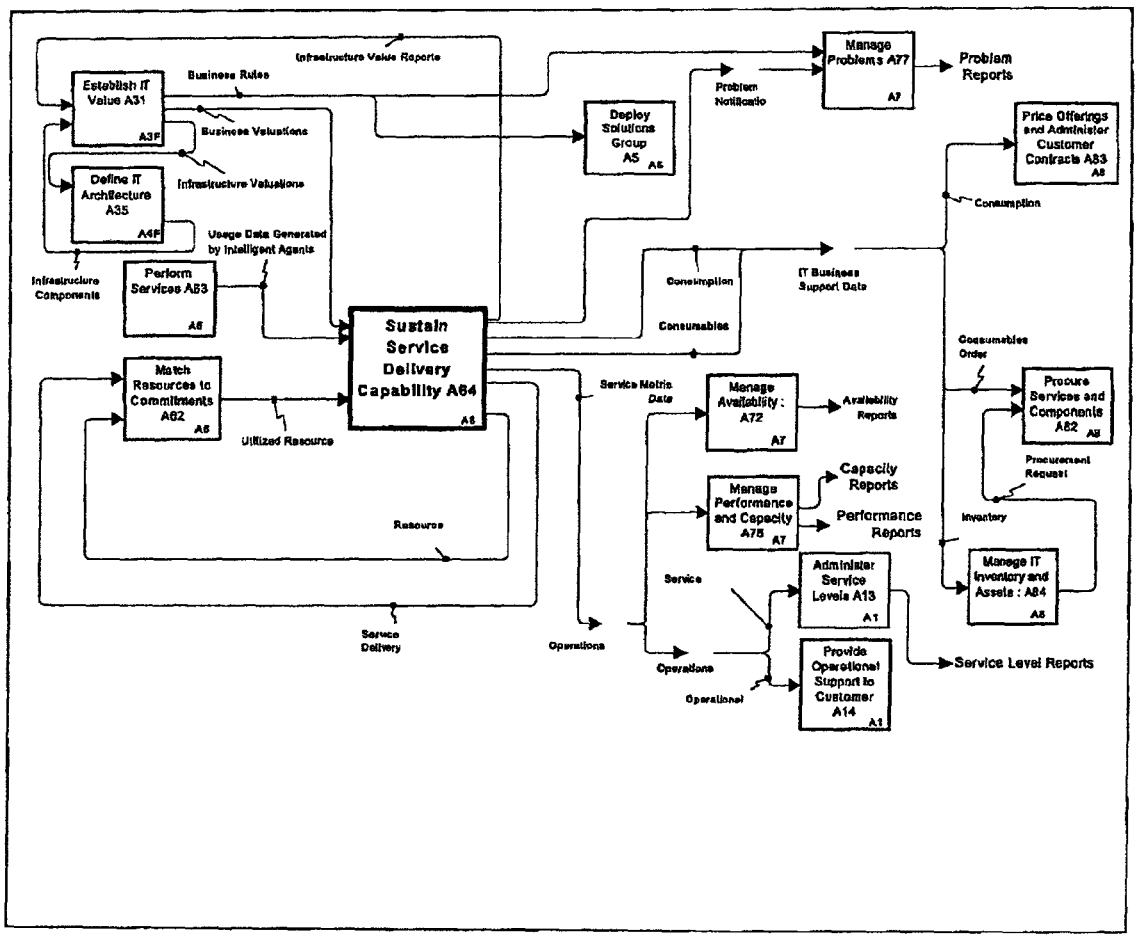
FIG. 5 illustrates the flow of work in which data gathered by the agents is utilized by a management system such as shown in FIG. 1.

The use of such collected data in the process model of FIG. 1 can be illustrated with respect to FIG. 5. Referring now to FIG. 5, each agent 24 periodically reports accumulated data related to the component on which it is installed to a 'Sustain Service Delivery Capability' process, A64 shown as part of process group A6. (Each process of FIG. 5 is identified by a letter and two digits as defined previously with respect to the process model of FIG. 1).

The 'Sustain Service Delivery Capability Process, A64, accumulates the data from the agents and creates the tables of FIGS. 2 and 4 various reports regarding (i) the value of each component in the delivery of each service, and (ii) the value of the component to the business enterprise as a whole, based on its multi-service applicability. These reports are provided to the 'Establish IT Value' process, A31 The accumulated data is also utilized by tactical processes such as Manage Performance and Capacity (A76), Manage Problems (A77), Manage Availability (A72). These tactical level processes allow changes to be made to the infrastructure for the purpose of outage prevention. The accumulated data is also offloaded to the Manage IT Assets and Infrastructure processes, A84, which is responsible for initial valuation judgments. This process is responsible for making tactical decisions regarding the replacement of equipment exhibiting higher than average failure rates, upon recommendations from the problem management process (A77), or insufficient capacity to maintain adequate performance levels, as recommended by the capacity planning process (A76). These decisions to replace equipment are then sent on to Procure Services and Components, Process A82. However, rather than a purely technical decision, involvement of these processes allows the decision to be based on business valuation, according to a return-on-investment model. The pricing and billing for customer usage, done by process A83, can be made much more granular, based on actual usage of infrastructure components reported by the agents 24 and the subsequently determined business value.

These business rules, created by the 'Establish IT Value' process, A31, but developed from operational data, would also be made available to process group A5, Deploy Solutions. As with problem management, the urgency of change requests for critical components can be modified based on these new business rules, as could the schedule for when changes are introduced. Based on predictive analysis of operational data, change requests could be accelerated or deferred in order to reduce the risk associated with such changes.

Process group A1, which includes processes typically executed by an IT organization's help desk, would also benefit from these new business rules. The priority of calls to the help desk, which utilizes process A14, Provide IT Operational Support to Customers, can be modified, for example, based on the new polices generated by analysis of operational data. Additionally, the 'Administer Service Level' process, A13, will have real-time information and reports available regarding service level attainment.

Finally, the accumulated data is made available to remaining processes in Group A3, the Manage IT Value set of processes, where it is utilized for strategy level decisions. By having access to detailed operational data, these processes can generate new polices to be fed to the operational management processes for incorporation into automated rules based recovery. These polices can now be business based, rather than pure technical decisions. As a result, operational activities such as load balancing, performed by Process A62, Match Resources to Commitments, can be done in advance of the need, rather than as a reaction to failed service level attainment. Problem management systems, Process A77, would also be supplied with this information to allow for business policy based modifications to problem severity. If, for example, a component suffered an outage just prior to critical business period or event, the problem management system could be made to automatically increase the severity of what might otherwise be viewed as a routine problem.

It will be appreciated that by having access to accumulated operational data captured by infrastructure element, strategic level decision making is much improved. Much more accurate business return analysis can be done to ensure the portfolio of services is providing value to the business. Contribution of individual architecture elements can be examined, and modification or architectures or replacement of components accelerated by the Define IT Architecture process A35. Projects being executed by process group A4, Realize Solutions, can be accelerated, slowed down, or stopped, based on their project impact on existing return-on-investment projections.

While the invention has been described in terms of specific embodiments, it is evident in view of the foregoing description that numerous alternatives, modifications and variations will be apparent to those skilled in the art. Accordingly, the invention is intended to encompass all such alternatives, modifications and variations which fall within the scope and spirit of the invention and the following claims.

We claim:

1. A computerized process for managing an integrated information technology (IT) system having a plurality of components and providing a plurality of services, the process comprising the steps of:
   collecting, at each of the components, usage data indicating an amount of use each component receives in providing each of the services;
   reporting the usage data of each component for each service;
   constructing a valuation function for valuing each service, correlating each service with each component used to provide said service;
   determining, by an agent, from said correlated services and components a value of each component and a value to said IT system; and
   constructing a relationship table identifying the components used in providing each service, wherein a configuration management process is fed by a change management process in order to maintain the relationship table as changes to said IT system are made.

2. The process according to claim 1, wherein said component value is determined from usage statistics accumulated at each component.

3. The process according to claim 2, further comprising the step of evaluating a worth of each component based on multiple uses of said component in multiple services performed by said IT system.

4. The process according to claim 1, wherein valuing a given service comprises determining a value for each transaction conducted in providing that service.

5. The process according to claim 1, further comprising the step of providing for each component an agent for accumulating transaction data regarding services provided using that component.

6. The process according to claim 5, wherein said value is determined in said determining step in accordance with the transaction data.

7. The process according to claim 5, wherein said transaction data includes the type of transaction and a value associated therewith.

8. The process according to claim 5, further comprising the step of reporting the transaction data.

9. A system for managing an IT infrastructure comprising:
   a processor;
   an information technology process model which defines a plurality of groups of processes defining information flow for an integrated management model defining the IT infrastructure for a plurality of IT services;
   a plurality of agents for monitoring each component of said IT infrastructure, said agents collecting transaction information identifying each transaction by service type;
   said agents reporting over said IT infrastructure transaction information to said information process model whereby said information is used by said model,
   wherein said information is processed to provide a table which identifies for each component the service in which the component participates and wherein said table includes a valuation of each component based on said component's participation in each of said services.

10. The system for managing an IT infrastructure according to claim 9, wherein said information from said agents are processed to derive a second table identifying a total value of each service based on said information.

11. The system for managing an IT infrastructure according to claim 10 wherein said total value is determined for at least some of said services based on the number of transactions performed by said services.

* * * * *